M. H. PADE.
CONVEYER.
APPLICATION FILED NOV. 6, 1920.

1,415,688.

Patented May 9, 1922.

Inventor
Max H. Pade
By A. L. Ely
Attorney

UNITED STATES PATENT OFFICE.

MAX. H. PADE, OF AKRON, OHIO, ASSIGNOR TO THE FIRESTONE TIRE AND RUBBER COMPANY, OF AKRON, OHIO, A CORPORATION OF OHIO.

CONVEYER.

1,415,688.

Specification of Letters Patent.   Patented May 9, 1922.

Application filed November 6, 1920.   Serial No. 422,296.

*To all whom it may concern:*

Be it known that I, MAX. H. PADE, a citizen of the United States, residing at Akron, in the county of Summit, State of Ohio, have invented certain new and useful Improvements in Conveyers, of which the following is a specification.

This invention relates to a device for supporting and carrying material of various kinds, being particularly adapted for use in rubber factories, to convey stock to points at which it is used from locations where it is prepared for use. Thus, it may be used for transporting strips or lengths of rubber coated fabric, such as used in the manufacture of tire casings, from the machines at which it is cut to the assemblers, who join the pieces preparatory to their use in the tire machines. It may also be used in transporting gum sheets, such as used in finishing the tires, from the tables at which they are prepared to the finishers.

The various articles which have been mentioned are difficult to handle mechanically as their sticky nature causes them to adhere when brought in contact with others or when parts of the same piece touch and subsequent separation is difficult and injures the stock. For this reason I have designed a conveyer mechanism which will carry the stock of the nature specified without danger of injury.

Figure 1:
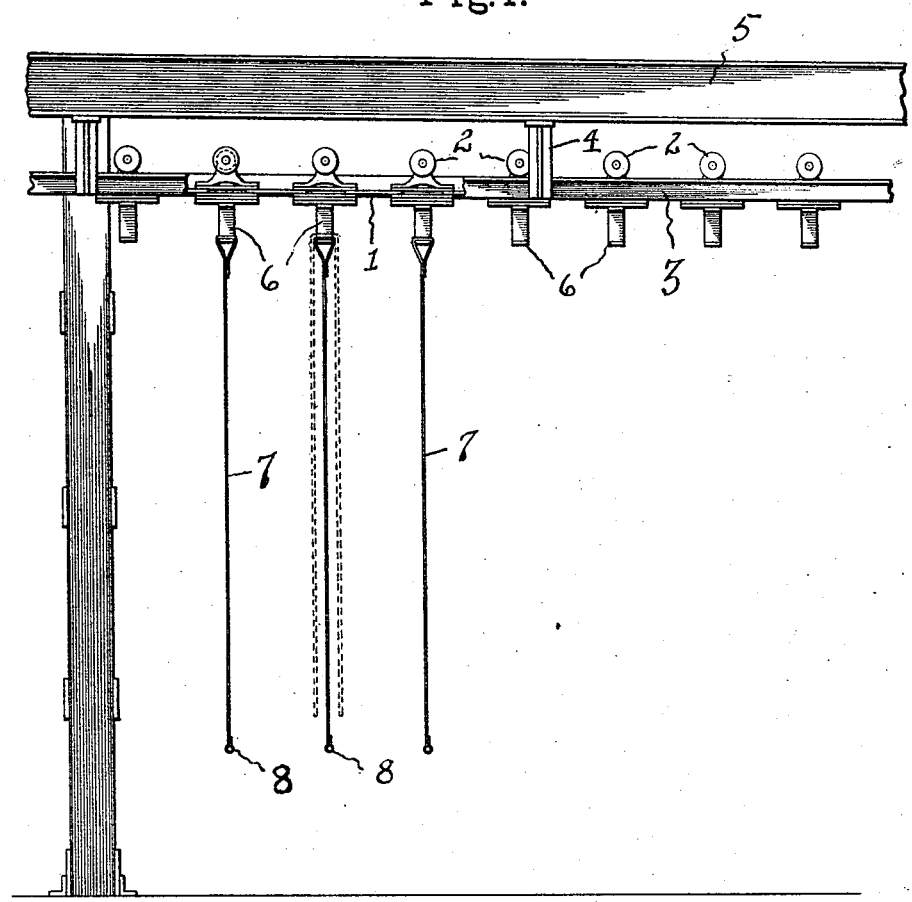
Fig. 1 is a side elevation of a conveyer of the nature described.
Figure 2:
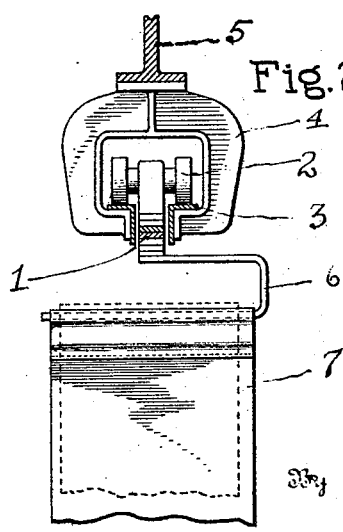
Fig. 2 is an enlarged view of a portion of the conveyer.

The conveyer comprises a chain 1 which is arranged to travel from the point of preparation of the stock to the location where it is used. The chain is supported on a series of rollers 2 which run on angle-iron tracks 3, supported in a series of hangers 4, which are in turn attached to beams or rails 5.

From the chain depend a plurality of hooks or supports 6, preferably C-shaped. On the lower horizontal bar of each hook the stock is hung, a piece being shown in dotted lines in the drawings, and in order to prevent contact of the facing surfaces of the material as it is being conveyed, a separator 7 is suspended from the hooks. This separator may be of any desired nature, but it has been found that a strip or sheet of fabric serves the purpose admirably and prevents the adhesion of the stock.

The lower end of the separator may be provided with a rod or weight 8, so that the separators are kept hanging vertically.

These separators may be of any preferred material, metallic plates or screens serving the same purpose as the fabric sheets. Other changes and modifications may be made within the scope of the invention without sacrificing any of its benefits.

I claim:

1. A conveyer for the uses and purposes set forth, comprising a moving conveyer element, a support on said conveyer element from which material may be suspended and a separator connected with the support to prevent contact of the material.

2. A conveyer for the uses and purposes set forth, comprising a moving chain, supports on said chain from which material may be suspended and separators on said supports to prevent the ends of the material on said support from contacting.

3. A conveyer for transporting articles of an adhesive character comprising a moving conveyer chain, a hook on said chain to support the articles and a separating device depending from the hook between the folds of the article to prevent contact.

4. A conveyer for transporting articles having adhesive faces, comprising a traveling element to support the material at about its midway point and a separator associated with said conveyer to prevent contact between the surfaces of the material.

5. A conveyer for transporting articles having adhesive surfaces, comprising a moving chain, means on said chain to support the material, and a separator beneath the chain to prevent contact of the surfaces of the material.

6. A conveyer for the uses and purposes set forth, comprising an endless chain, a plurality of hooks depending from said chain, and flexible separators on said hooks to prevent contact of the surfaces of the material.

MAX. H. PADE.